US009662563B2

(12) United States Patent
Van Asdale et al.

(10) Patent No.: US 9,662,563 B2
(45) Date of Patent: May 30, 2017

(54) TABLE GAME

(71) Applicant: Rolled Up Gaming Partners, Reno, NV (US)

(72) Inventors: Shawn Michael Van Asdale, Reno, NV (US); Richard Brian Lopez, San Rafael, CA (US)

(73) Assignee: Rolled UP Gaming Partners, Reno, NV (US)

( * ) Notice: Subject to any disclaimer, the term of this patent is extended or adjusted under 35 U.S.C. 154(b) by 760 days.

(21) Appl. No.: 13/656,745

(22) Filed: Oct. 22, 2012

(65) Prior Publication Data

US 2014/0113712 A1 Apr. 24, 2014

(51) Int. Cl.
*A63F 13/00* (2014.01)
*A63F 9/24* (2006.01)
*G07F 17/32* (2006.01)

(52) U.S. Cl.
CPC .............. *A63F 9/24* (2013.01); *G07F 17/326* (2013.01); *G07F 17/3258* (2013.01); *G07F 17/3262* (2013.01); *G07F 17/3267* (2013.01); *G07F 17/3293* (2013.01)

(58) Field of Classification Search
CPC ............. G07F 17/3244; G07F 17/3267; A63F 2003/0017
USPC ............................................................ 463/25
See application file for complete search history.

(56) References Cited

U.S. PATENT DOCUMENTS

| | | | |
|---|---|---|---|
| 5,116,055 A | 5/1992 | Tracy | |
| 5,707,285 A | 1/1998 | Place et al. | |
| 5,885,158 A | 3/1999 | Torango et al. | |
| 6,168,520 B1 | 1/2001 | Baerlocher et al. | |
| 7,384,336 B2 | 6/2008 | Torango | |
| 7,931,532 B2 | 4/2011 | Johnson | |
| 2011/0034237 A1* | 2/2011 | Schulhof et al. | 463/25 |

* cited by examiner

*Primary Examiner* — David L Lewis
*Assistant Examiner* — Robert Mosser
(74) *Attorney, Agent, or Firm* — Kwan & Olynick LLP

(57) ABSTRACT

The present invention involves live gaming tables where players make one or more wagers on the outcome of a game played according to a predetermined set of rules. The table game is characterized by having a progressive prize that may be won through the play of a plurality of different bonus games. Each bonus game has a different triggering event associated with it and is preferably differentiated from the other bonus games by the probability of winning the progressive prize through the bonus game. The triggering event for each bonus game is preferably a combination of cards formed by the players' hands, the dealer's hand and/or a combination thereof. In additional embodiments of the present invention, a plurality of different table games played with different rules employ a plurality of bonus games associated with the different tables that allows different table games with otherwise disparate and fixed odds to have fair odds of winning a communal progressive prize.

15 Claims, 5 Drawing Sheets

TABLE GAME

BACKGROUND OF THE INVENTION

The present invention is an improved method and apparatus for awarding a progressive prize on a casino table game. There are a number of casino table games that are based on the rules of poker, such as pai gow, as well as proprietary games such as 3 Hand Hold 'Em™, Three Card Poker™, Crazy For Poker™, Ultimate Texas Hold 'Em™ and others. Each of these games is typically played with one standard deck of playing cards. Other popular casino table games, such as black jack, may be played with one or more decks of cards.

The basic object of most casino table games is for the player and house (represented by a dealer) to each make a hand. If the house's hand is better than the player's hand, evaluated using a predetermined set of rules, the player typically loses his wager. If the player's hand is better than the house's, the player typically is awarded a prize equal to his wager. In order for the game to be profitable for the casino, the rules have to provide the house with an edge over the player.

In some games, the house's edge in the game is large enough that the player may be awarded a multiple of his wager in certain situations. Players enjoy receiving multiplied returns on their wagers. The house's edge is rarely great enough to support a multiplier of greater than three however, and almost never greater than ten. As the house's edge is increased, the players win much less often and view the game as unfairly weighted to the house's advantage and the game becomes less enjoyable for players. Thus, to provide enjoyable table games, casinos must balance the player's desire to receive a multiplied prize against the player's desire to play a game where the house's edge is perceived as small.

One of the ways casinos achieve the desired balance is to award multipliers based on the probability of the hand made by the players or the house or a combination thereof. These hands can have sufficiently rare probabilities that attractive multipliers can be awarded to the player. For instance, in a five-card stud poker game, the highest and rarest hand that can be achieved using a standard fifty-two card deck and traditional poker hand rankings is a royal flush (ace, king, queen, jack and ten, all of the same suit). The probability of that hand occurring is 325,635 to 1. A casino could conceivably pay a player a multiplier of 300,000× on a wager when they achieve a royal flush and still maintain an edge.

The multiplier may be paid based on the player's primary wager (typically the wager the player makes that their hand will be better than the house's) or it may be paid on a separate side wager. The advantage of using a side wager is that higher multipliers may be paid while maintaining the house's edge. For instance, if a five-card stud table game pays even money on a primary wager and the player wins 48% of the time, the house's edge would be 4% (i.e., $1-(2\times0.48)=0.04$). It will be understood by those skilled in the art that if the house's edge is 4%, the return to the player is the remainder from 100%, or 96%. Any additional multiplier payout made on the primary wager would reduce the house's edge further. So if a multiplier were to be paid for a player receiving a royal flush, and only a royal flush, it would be limited to approximately 13,025 to 1 (i.e., 4% of 325,635). As additional hands other than a royal flush are included in the group of hands that award multipliers, the maximum multiplier would be reduced even further. By awarding multipliers on a side wager versus a primary wager, the house is no longer constrained by the 4% edge associated with the primary wager.

With sufficiently rare hands, the casino can also award a player a progressive prize. A progressive prize is generally understood to be a large prize (typically the largest prize available at a given game) with an amount that is increased over time. This is typically done by taking a small portion of each wager made and adding it to the progressive amount. Other progressive prizes may increment solely on the amount of time it takes for a player to win it. Still further, progressive prizes have been suggested that decrease over time or that reset to a minimum value once a maximum value is reached. Typically the progressive prize could only be won by a player at a table game by achieving the rarest hand possible (e.g., a royal flush in five-card stud). To further increase the odds, some casinos have specified additional restraints, such as suit (e.g., a royal flush in spades in the five-card stud game). In such instances, lesser or more commonly occurring hands (e.g., a royal flush in any of the other three suits) may be awarded a small percentage, perhaps 10%, of the progressive. By requiring a rarer hand to win the progressive prize, casinos ensure that the progressive prize will grow for a longer period of time. Players typically are attracted to games with larger progressive prizes. However, it is believed that players also become frustrated if the progressive prize is too difficult to achieve. Therefore, once again casinos are left to find the best balance for a game that is profitable to the casino and enjoyable to the player.

Two related inventions that attempt to allow casinos and game designers to more easily achieve this balance is Johnson, U.S. Pat. No. 7,931,532 and Place, U.S. Pat. No. 5,707,285 issued to Paltronics and incorporated herein by reference. These references generally teach allowing table game player to play a bonus game driven by a computer generated random number (or random number generator or RNG) whenever the player achieves a specific qualifying event (e.g., a black jack in a twenty-one game). The bonus game disclosed is a physical wheel which is spun to indicate one of a variety of payouts, one of which includes the progressive prize.

It will be appreciated by those skilled in the art that by adding the intermediate bonus game, these references necessarily decrease the probability of the player winning the progressive. Indeed, this is the stated intent of Place. For instance, if in the hypothetical five-card stud game previously discussed, the player gets to play the bonus game disclosed in Johnson and Place upon achieving a royal flush, and the bonus game awards the progressive once every hundred tries, then the odds of winning the progressive are 325,635 (the odds of a royal flush) times 100 (the odds of winning the progressive in the bonus game) or 32,563,500 to 1.

SUMMARY OF THE INVENTION

The present invention improves on the prior art by providing players the opportunity to achieve at least one of a plurality of qualifying events for at least one of a plurality of bonus games. In the preferred embodiment, the method for the player to qualify for a bonus game will be for the player and/or the house to achieve one of a plurality of predetermined hand combinations. The qualifying event will entitle the player to play one of a plurality of bonus games. Preferably, each qualifying event will be associated with a different bonus game and the bonus games will be at least differentiable by the probability of winning a progressive prize and/or their expected return to the player.

By providing a plurality of qualifying events and a plurality of differentiated bonus games, the casino and/or table game designer is afforded a much greater flexibility in awarding a progressive prize. The progressive prize can now be awarded more or less frequently, as the casino desires. Additionally, prior art games were generally constrained by the inherently fixed odds of achieving a specific hand combination in a table game using a standard playing deck of cards for a given game's established rules. Therefore it was impractical for two different types of table games to compete for the same progressive prize. The present invention overcomes that limitation and allows players of multiple distinct games the opportunity to fairly contribute to a single progressive prize and compete for the prize through a plurality of bonus games.

These and other advantages of the present invention will become more clear as explained below.

DETAILED DESCRIPTION OF THE PREFERRED EMBODIMENTS

Figure 1:
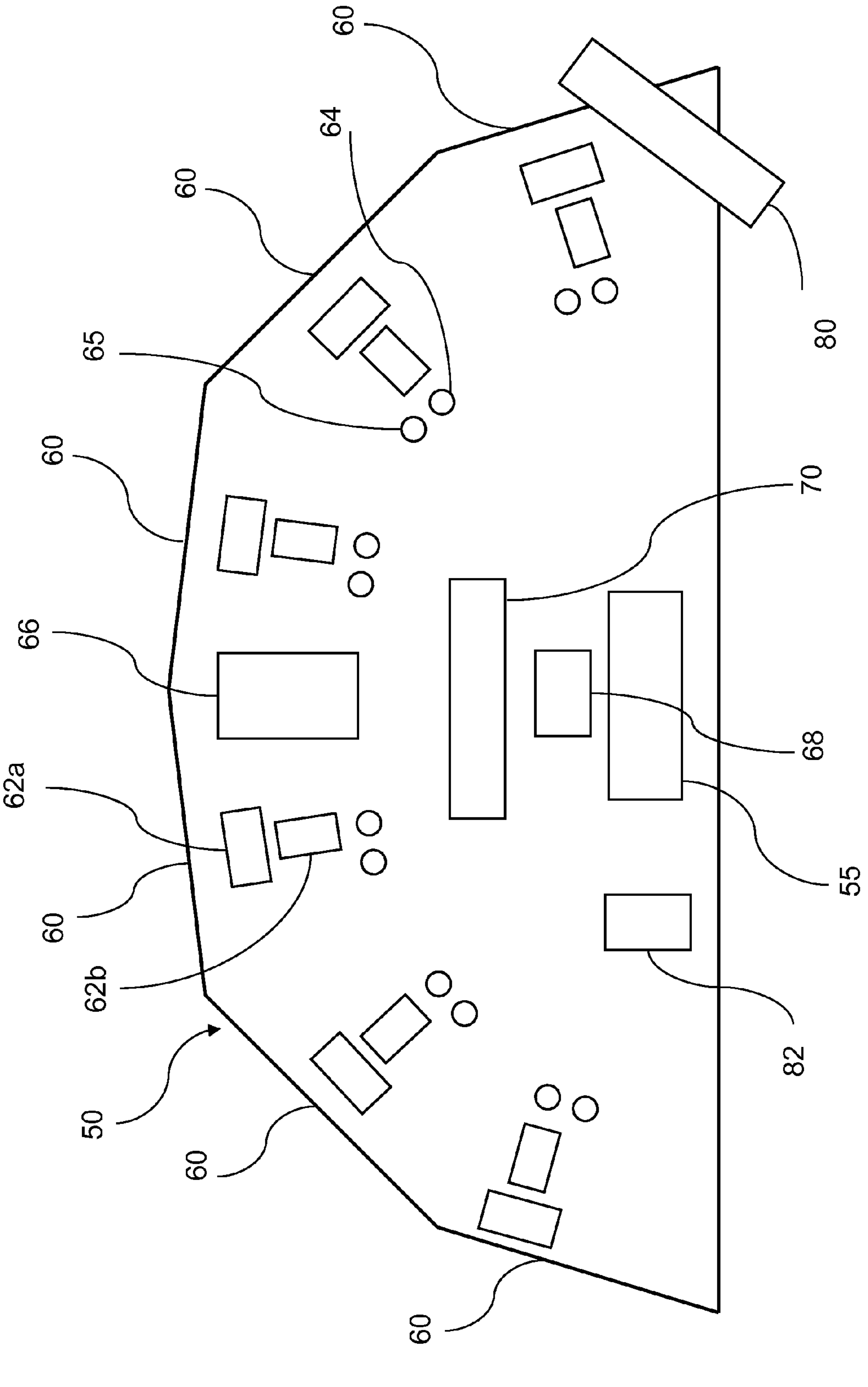
FIG. 1 is a first table layout that may be used for implementing the present invention on a pai gow poker game.

One embodiment of the present invention may be played on a table 50 as shown in FIG. 1. The layout for table 50 is designed to accommodate a pai gow game. A dealer employed by the casino stands behind the table 50 with access to a tray 55. The tray 55 holds chips of various denominations used to pay out players' winning wagers. Each player sits at the table 50 behind a player position 60. In the pai gow poker embodiment shown, each player position has a high hand position 62*a*, and a low hand position 62*b*. Each hand position 62 also has an associated primary wager circle 64 located directly in front of the high hand position 62*a* where players place their primary wagers on the hand. Each hand position 62 also has an associated secondary wager circle 65 located adjacent to the primary wager circle 64 where players place their secondary wagers on the hand. Preferably, the table 50 also has at least one legend 66 showing the multiplier associated with certain hands. The table 50 is also equipped with a video display 80. The video display is used to display the bonus games of the present invention and is under control of a dealer control pad 82.

Play of the game begins by each player placing a wager in the primary wager circles 64 of their player position 60. The players may also place a wager in the secondary wager circles 65 of their player position 60. In the preferred embodiment, the secondary wager is voluntary and the primary wager is mandatory. However, in alternative embodiments the secondary wager may be mandatory. Once all of the wagers have been placed, the dealer deals seven cards to at least each occupied player position 60 and to the dealer from a randomly shuffled deck of cards. Preferably it is a standard playing card deck with fifty-two suited cards and one joker that can be used as an ace or to complete a straight, flush or straight flush.

The player then examines his cards and divides them into a high hand consisting of five cards and a low hand consisting of two cards. The rules of pai gow poker dictate that the high hand (using standard five-card poker hand rankings) must be higher in value than the two card hand. The standard rank of five-card poker hands is shown in the table below:

TABLE 1

| 5 CARD POKER HANDS |
|---|
| Royal Flush |
| Straight Flush |
| Four of a Kind |
| Full House |
| Flush |
| Straight |
| Three of a Kind |
| Two Pair |
| One Pair |
| High Card |

The player indicates his hand is set by placing the high hand in the high hand position 62*a* and the low hand in the low hand position 62*b*. Once all of the player hands are set, the dealer reveals her hand and sets the hand according to pre-established house rules. The dealer sets her high hand in a dealer high hand position 70 and her low hand in a dealer low hand position 68.

The dealer then reveals each of the player's hands and compares them to the dealer's hands. The primary wager is resolved as follows: If player's high hand beats the dealer's high hand and the player's low hand beats the dealer's low hand, the dealer pays the player even money on the primary wager in primary wager circle 64. If player's high hand loses to the dealer's high hand and the player's low hand loses to the dealer's low hand, the player loses and the dealer collects the primary wager in primary wager circle 64. All other instances result in a push between the dealer and the player.

After the dealer has resolved the primary wager, the dealer evaluates the secondary wager. Preferably the secondary wager is paid according to the pay table shown on the legend 66. Each player hand is preferably evaluated regardless of how the player chose to set their hand. For instance, a player dealt a full house that chooses to play three of a kind for his high hand and a pair for his low hand is still paid for a full house. The seven-card hand rankings, with the associated multipliers that are paid for the player's secondary wager for a prior art game are shown in the table below:

TABLE 2

PRIOR ART 7 CARD HANDS AND PAYS

| HAND | PROBABILITY | PAY |
|---|---|---|
| 7 Card St Flush No Joker | 2.07599E−07 | Progressive |
| 7 Card St Flush W/ Joker | 1.27155E−06 | 1000 |
| 5 Aces | 7.31788E−06 | 400 |
| Royal Flush | 0.000169271 | 150 |
| Straight Flush | 0.001197874 | 50 |
| Four of a Kind | 0.001994718 | 25 |
| Full House | 0.027172988 | 5 |
| Flush | 0.040041292 | 4 |
| Three of a Kind | 0.049775183 | 3 |

TABLE 2-continued

| PRIOR ART 7 CARD HANDS AND PAYS | | |
|---|---|---|
| HAND | PROBABILITY | PAY |
| Straight | 0.071584167 | 2 |
| All Other Hands | 0.808055710 | 0 |
| | 1.000000000 | |

The seven-card hand rankings, with the associated pay table (that is preferably shown legend 66) for a preferred embodiment of the present invention applied to a pai gow poker game are shown in the table below:

TABLE 3

| 7 CARD HANDS AND PAYS | | |
|---|---|---|
| HAND | PROBABILITY | PAY |
| 7 Card St Flush No Joker | 2.07599E−07 | Progressive |
| 7 Card St Flush W/Joker | 1.27155E−06 | Bonus Game 1 |
| 5 Aces | 7.31788E−06 | Bonus Game 2 |
| Royal Flush | 0.000169271 | Bonus Game 3 |
| Straight Flush | 0.001197874 | Bonus Game 4 |
| Four of a Kind | 0.001994718 | Bonus Game 5 |
| Full House | 0.027172988 | Bonus Game 6 |
| Flush | 0.040041292 | 4 |
| Three of a Kind | 0.049775183 | 3 |
| Straight | 0.071584167 | 2 |
| All Other Hands | 0.808055710 | 0 |
| | 1.000000000 | |

As demonstrated by Table 3, whenever a player achieves a flush, straight or three of a kind, they receive a fixed multiplier on their secondary wager, as in the prior art game. Whenever a player achieves the rarest hand possible, the seven-card straight flush without the use of a joker, the player is awarded the progressive prize without further play as in the prior art game demonstrated on Table 2. However when the player achieves one of the six hands comprising a seven-card straight flush with a joker, five aces (using the joker), a royal flush (with or without the joker), a straight flush (with or without the joker), four of a kind or a full house, the player will be awarded the opportunity to play a bonus game. The bonus game to be played is determined by the combination of cards, or hand hierarchy, achieved.

Figure 3:
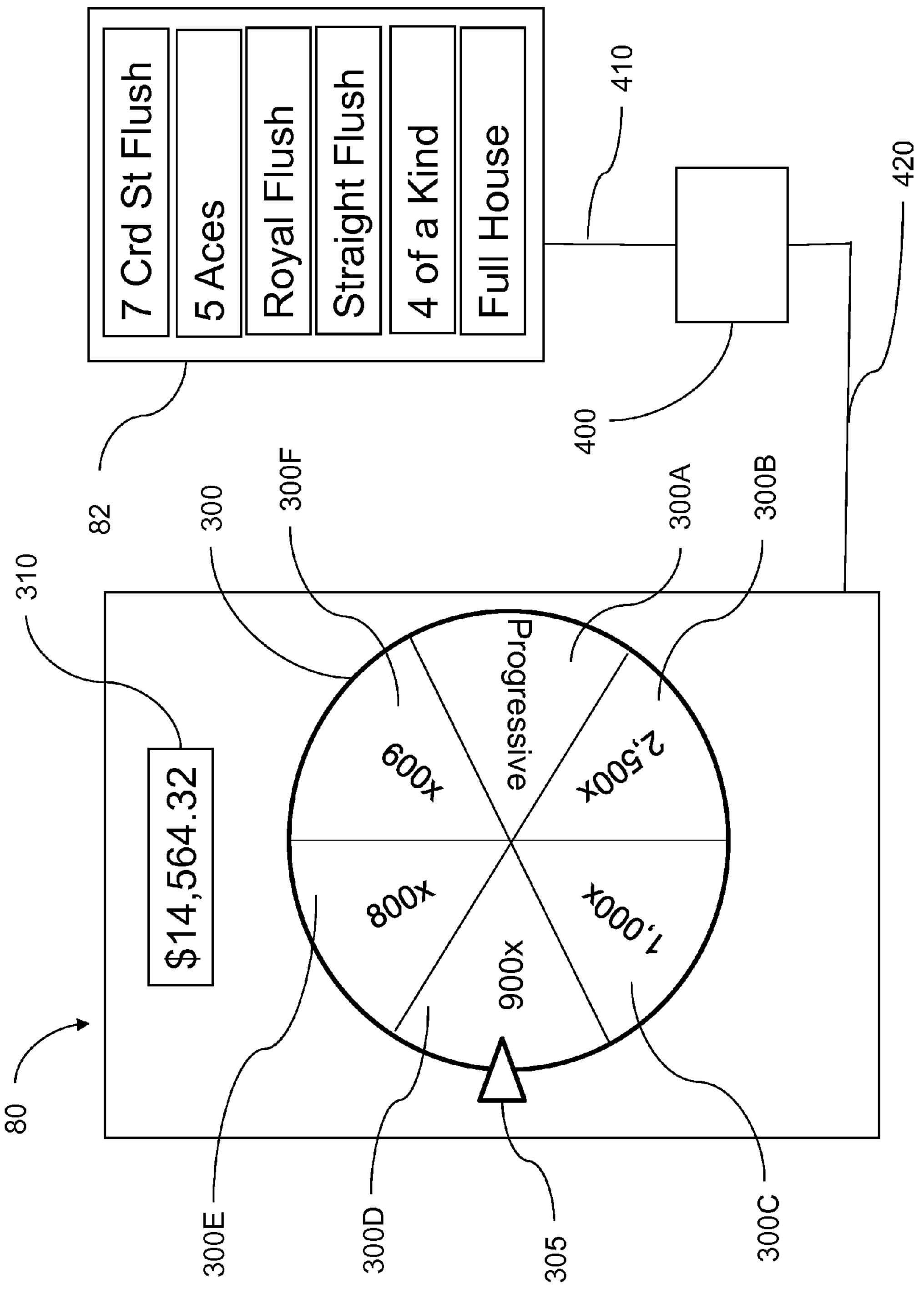
FIG. 3 is a functional view of a display device and control pad shown in FIGS. 1 and 2 as well as a computer that may be used for implementing the present invention.

Referring now to FIG. 3, in the preferred embodiment, each of the six hands that qualify the player to play a bonus game, entitle the player to play a bonus game that is specific to the qualifying hand. The bonus game to be played is preferably played on the video display 80. In the preferred embodiment each of the bonus games is the spin of a wheel 300 on the video display 80. The wheel 300 is divided into six segments, 300A, 300B, 300C, 300D, 300E and 300F. Each segment indicates a prize. Preferably, one of the segments indicates that the player has won the progressive prize. The other segments preferably indicate a multiplier that the player is paid on his secondary wager.

The segment and therefore the prize to be awarded to the player is indicated by a pointer 305. In practice, the wheel is spun and the segment is selected using a computer 400 executing a RNG using methods well known in the art. The probability of a specific segment being selected can therefore be weighted as desired.

The amount of the progressive prize may also be shown on the video display 80 in a banner 310 that is continually updating the amount of the progressive. Alternatively, the amount of the progressive may be shown on a separate display (not shown).

In the preferred embodiment the dealer enters a player's qualifying hand in the control pad 82. The control pad 82 communicates with the computer 400 via an input pathway 410 and the computer 400 alters the video output sent to the video display 80 via a video pathway 420 to display the appropriate bonus wheel 300. In the exemplar shown on FIG. 3 a wheel corresponding to Bonus Game 1 is being shown. The bonus game may then be played automatically or initiated through additional input from the dealer or player through the control pad 82 or additional inputs, such as buttons installed at each player position (not shown).

Each bonus wheel 300 comprises the bonus game and can be defined by the multiplier values shown on the segments 300A to 300F as well as the probability of each segment being selected. Tables 4 to 9 below shows the bonus games and average return to the player for the preferred embodiment of the present game where the progressive resets at an amount of $5,000 and the secondary wager is $1. The bonus game shown on the display device 80 in FIG. 3 corresponds to Bonus Game 1 below.

TABLE 4

| BONUS GAME 1 - 7 CARD STRAIGHT FLUSH W/JOKER | | | |
|---|---|---|---|
| SEGMENT | PRIZE | PROBABILITY | RETURN |
| A | Progressive | 0.02000 | 100 |
| B | 2,500X | 0.08000 | 200 |
| C | 1000X | 0.20000 | 200 |
| D | 900X | 0.24000 | 216 |
| E | 800X | 0.26000 | 208 |
| F | 600X | 0.20000 | 120 |
| | | 1.00000 | 1044 |

By displaying a different wheel 300 with different amounts indicated in segments 300A-F, the same display 80 can also be used to play the following bonus games:

TABLE 5

| BONUS GAME 2 - 5 ACES | | | |
|---|---|---|---|
| SEGMENT | PRIZE | PROBABILITY | RETURN |
| A | Progressive | 0.00160 | 8.0 |
| B | 800X | 0.04800 | 38.4 |
| C | 600X | 0.08000 | 48.0 |
| D | 400X | 0.28000 | 112.0 |
| E | 300X | 0.31200 | 93.6 |
| F | 250X | 0.27840 | 69.6 |
| | | 1.00000 | 369.6 |

TABLE 6

| BONUS GAME 3 - ROYAL FLUSH | | | |
|---|---|---|---|
| SEGMENT | PRIZE | PROBABILITY | RETURN |
| A | Progressive | 0.00100 | 5.0 |
| B | 250X | 0.04000 | 10.0 |
| C | 200X | 0.08000 | 16.0 |
| D | 150X | 0.32000 | 48.0 |
| E | 100X | 0.35100 | 35.1 |
| F | 75X | 0.20800 | 15.6 |
| | | 1.00000 | 129.7 |

TABLE 7

| BONUS GAME 4 - STRAIGHT FLUSH | | | |
|---|---|---|---|
| SEGMENT | PRIZE | PROBABILITY | RETURN |
| A | Progressive | 0.00040 | 2.00 |
| B | 250X | 0.08000 | 8.00 |
| C | 200X | 0.11960 | 8.97 |
| D | 150X | 0.18000 | 9.00 |
| E | 100X | 0.32000 | 9.60 |
| F | 75X | 0.30000 | 6.00 |
| | | 1.00000 | 43.57 |

TABLE 8

| BONUS GAME 5 - 4 OF A KIND | | | |
|---|---|---|---|
| SEGMENT | PRIZE | PROBABILITY | RETURN |
| A | Progressive | 0.00020 | 1.000 |
| B | 50X | 0.01000 | 0.5000 |
| C | 30X | 0.02000 | 0.6000 |
| D | 25X | 0.24000 | 6.000 |
| E | 20X | 0.37500 | 7.500 |
| F | 15X | 0.35480 | 5.322 |
| | | 1.00000 | 20.922 |

TABLE 9

| BONUS GAME 6 - FULL HOUSE | | | |
|---|---|---|---|
| SEGMENT | PRIZE | PROBABILITY | RETURN |
| A | Progressive | 0.00004 | 0.2000 |
| B | 8X | 0.02000 | 0.1600 |
| C | 6X | 0.05996 | 0.3598 |
| D | 5X | 0.32000 | 1.6000 |
| E | 4X | 0.32000 | 1.2800 |
| F | 3X | 0.28000 | 0.8400 |
| | | 1.00000 | 4.4398 |

The total return to the player for the secondary wager can be calculated by summing the return to the player for each hand combination along with the percentage contribution of each bet that is added to the progressive prize. The return for each hand is the probability of each hand times the average return to the player for that hand, when expressed as a "for one" pay for its associated bonus game (e.g., the return on a full house is 0.027172988×(4.44+1)=0.147814531). Similarly, the probability of a player winning the progressive prize can be calculated by summing the probability of a qualifying hand by the probability of winning the progressive through the associated bonus game. These two calculations are illustrated for the discussed preferred embodiment in Table 10 below:

TABLE 10

| PAI GOW SECONDARY WAGER RETURNS | | |
|---|---|---|
| HAND | RETURN | PROGRESSIVE WIN |
| 7 Card St Flush No Joker | 0.001038204 | 2.07599E−07 |
| 7 Card St Flush W/Joker | 0.001328765 | 2.54309E−08 |
| 5 Aces | 0.002712005 | 1.17086E−08 |
| Royal Flush | 0.022123759 | 1.69271E−07 |
| Straight Flush | 0.053389248 | 4.7915E−07 |
| Four of a Kind | 0.043728211 | 3.98944E−07 |
| Full House | 0.147814531 | 1.08692E−06 |
| Flush | 0.200206458 | 0 |
| Three of a Kind | 0.199100732 | 0 |

TABLE 10-continued

| PAI GOW SECONDARY WAGER RETURNS | | |
|---|---|---|
| HAND | RETURN | PROGRESSIVE WIN |
| Straight | 0.214752501 | 0 |
| All Other Hands | 0.00000000 | 0 |
| Progressive Contribution | 0.05000000 | |
| | 0.936194414 | 2.37902E−06 |

Therefore, the secondary wager in the preferred embodiment discussed has a house edge of approximately 6.4%. By inverting the total probability of winning the progressive, the average number of hands required for the progressive to be won, or progressive cycle, can also be determined. In the preferred embodiment discussed the progressive cycle is 420,341 games (e.g. 1/2.37902E-06). It will be appreciated by those skilled in the art that the progressive cycle for the prior art games was always greater than 4,816,971. Thus, through the addition of a plurality of bonus games and associated qualifying events the progressive cycle has been reduced to a level more desired by the casino.

Preferably, as indicated in the previously discussed embodiment, the probability of the hand resulting in the bonus game is inversely related to the probability of winning the progressive prize by playing the associated bonus game. In other words, when players qualify for a bonus game with rarer hand, they are more likely to win the progressive prize relative to when players qualify for a bonus game with a hand that is not as rare.

Although the bonus games in the preferred embodiment have been described as a plurality of video reels, there is no requirement that all of the bonus games be the same type of game. For instance, one of the bonus games could be a video reel, or a group of reels as is routinely used in slot machines. Other bonus games are also possible. Additionally, although the bonus games described have been played in a video format, it would be a simple matter to develop one or more mechanical bonus games, such as a mechanical wheel. The use of the video display 80 is preferable because the plurality of bonus games can readily be played on a single device, however.

Figure 4:
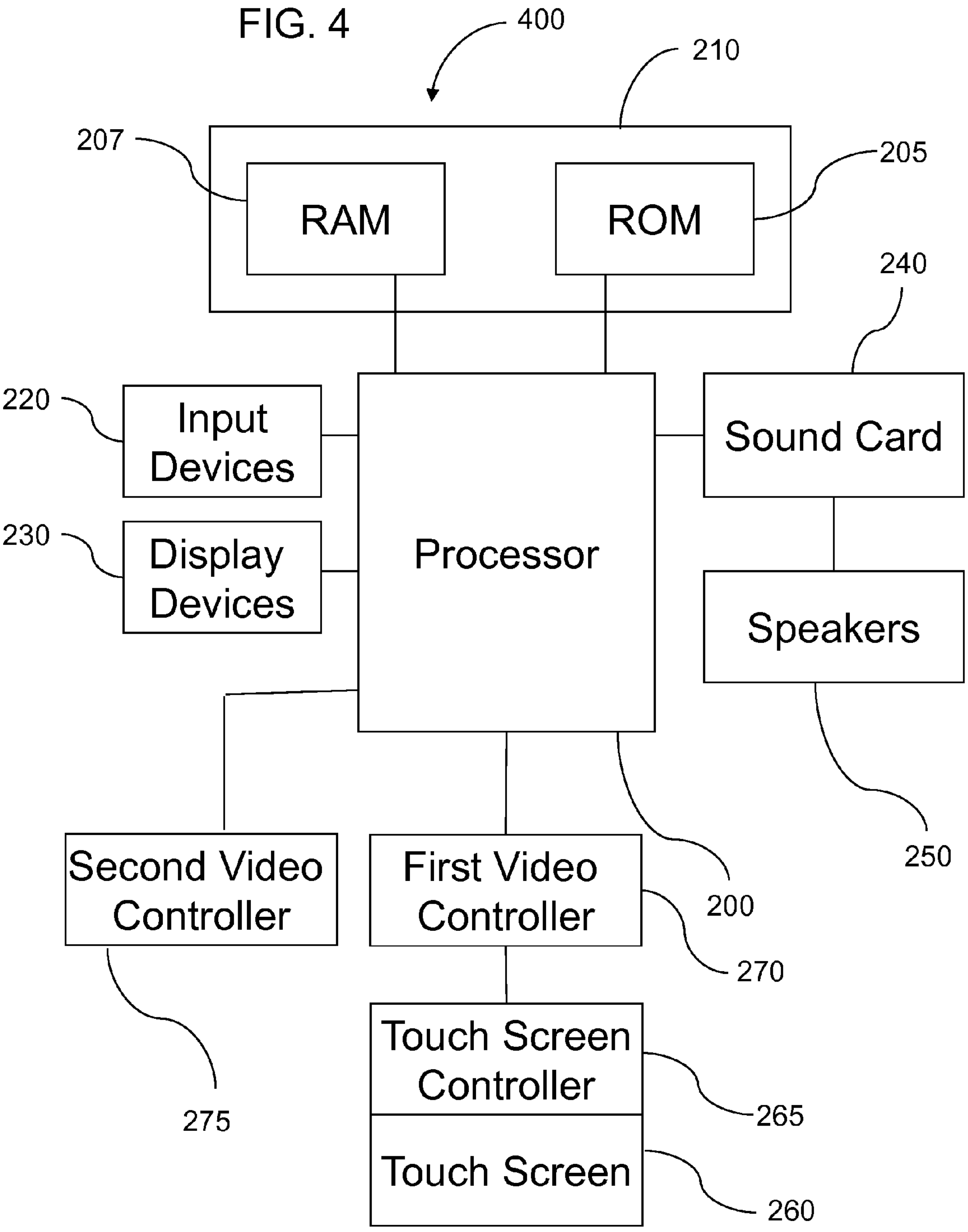
FIG. 4 is a schematic of a computer that may be used for implementing the present invention.

FIG. 4 shows the primary components comprising the computer 400 used in the present invention. The computer 400 comprises a processor 200 and memory device 210. Preferably the computer 400 is located at the gaming table, but it should be appreciated that it is possible for both the processor 200 and memory device 210 to reside at a central location instead of at the gaming table. In such a situation, a network server may be used to communicate to the gaming device over an Internet connection, local area network (LAN), or wide area network (WAN).

The computer 400 is configured to output video to one or more display devices 230 using a video controller 270 or controllers 275. The display devices 230 preferably include the control pad 82 and video display 80. Preferably the computer 400 receives inputs from a touch screen 260 affixed to the control pad 82 utilizing a touch screen controller 265. Other input devices 220, such as buttons, may also be utilized by either the player or the dealer to communicate with the computer 400. Other input devices 220 may be used to detect wagers placed in the wager circles 65 and 64. In addition to video output, the computer may provide audio output via a sound card 240 and speakers 250.

The computer 400 has two primary purposes in the present invention. The first is to administer the progressive prize and increment accordingly. This is done by storing the amount of the progressive prize in memory 210. Additionally, preferably secondary wagers placed on secondary wager circles 65 are detected using methods well known in the gaming art, such as, but not limited to, mechanically detecting a gaming chip placed in a slot, or using light, sonic waves, RFID technology or cameras communicating with pattern recognition software to detect the presence and/or denomination of gaming chips. Such systems are generally described in Bahar, U.S. Pat. No. 7,559,839, incorporated herein by reference. The current amount of the progressive prize is preferably shown by the computer 400 using one of the display devices 230.

The second primary purpose of the computer 400 is to conduct the play of the plurality of bonus games. Preferably the software for play of the bonus games, including probabilities, pays, associated animations and a RNG are stored on the memory 210.

Figure 2:
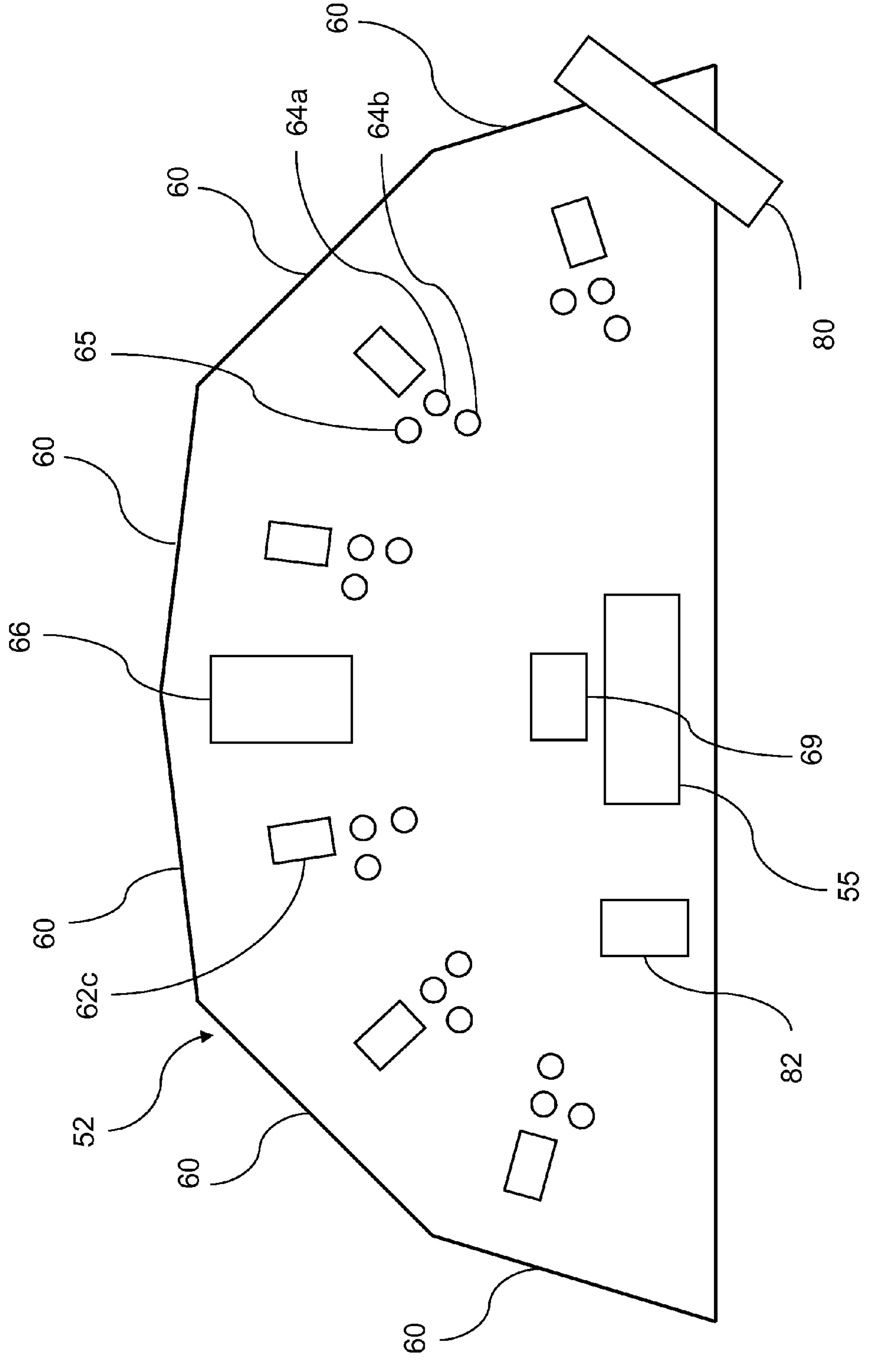
FIG. 2 is a second table layout that may be used for implementing the present invention on a Four Card Poker™ game.

Additional advantages of the present invention will now be described by discussing another embodiment utilizing a different basic table game. FIG. 2 shows a table 52 suitable for playing a table game known as Four Card Poker™ as described in U.S. Pat. No. 7,584,966 issued to Shuffle Master, Inc. In the game, each player places an initial primary wager in a first primary wager circle 64*a* as well as a secondary wager in secondary wager circle 65. Each player and the dealer is then dealt five cards from a standard card deck of fifty-two cards that they use to make a four-card poker hand. If the player desires to play his hand against the dealer's the player places an additional primary wager in second primary wager circle 64*b* and places his hand in a player hand position 62*c*. If the player doesn't desire to play further, he folds his hand and the dealer collects the wagers from circles 65 and 64*a*.

Once all player hands are set, the dealer reveals the dealer's hand at a dealer hand position 69. Each player's hand is then compared to the dealer's hand using a predetermined hierarchy of hands and the player is paid on for winning hands on the primary wagers. If the player's hand is sufficiently high on the hierarchy of hands, they were also paid, in the prior art game, a fixed multiplier of the player's secondary wager. By applying the present invention to this known game a plurality of bonus games will now be awarded to the player in lieu of the fixed multiplier. The hierarchy for the four card poker hands as well as the pays (which are indicated on legend 66) and probabilities associated with each in a preferred embodiment are shown in Table 11, below:

TABLE 11

4 CARD HANDS AND PROBABILITIES

| HAND | PROBABILITY | PAY |
|---|---|---|
| 4 Aces | 1.84689E−05 | Bonus Game 7 |
| 4 Kings to Tens | 7.38757E−05 | Bonus Game 8 |
| 4 Nines to Twos | 0.000147751 | Bonus Game 9 |
| Straight Flush | 0.000797242 | Bonus Game 10 |
| Three of a Kind | 0.022569028 | Bonus Game 11 |
| Flush | 0.044100717 | 4 |
| Straight | 0.039172592 | 3 |
| Two Pair | 0.047539016 | 2 |
| Pair of Aces | 0.031203251 | Push |
| All Other Hands | 0.814378059 | 0 |
| | 1.000000000 | |

As with the Bonus Games 1 to 6 for the previous embodiment involving pai gow, Bonus Games 7 to 11 for an embodiment of the present invention for use in a Four Card Poker™ game can be defined by the following Tables 12 to 16.

TABLE 12

BONUS GAME 7 - 4 ACES

| SEGMENT | PRIZE | PROBABILITY | RETURN |
|---|---|---|---|
| A | Progressive | 0.040132 | 200.6600 |
| B | 2,500 | 0.040000 | 100.0000 |
| C | 1,500 | 0.200000 | 300.0000 |
| D | 1,000 | 0.239880 | 239.8800 |
| E | 700 | 0.240000 | 168.0000 |
| F | 500 | 0.239988 | 119.9940 |
| | | 1.00000 | 1128.5340 |

TABLE 13

BONUS GAME 8 - 4 KINGS TO 4 TENS

| SEGMENT | PRIZE | PROBABILITY | RETURN |
|---|---|---|---|
| A | Progressive | 0.00416 | 20.800 |
| B | 500 | 0.15780 | 78.900 |
| C | 300 | 0.20000 | 60.000 |
| D | 250 | 0.20400 | 51.000 |
| E | 150 | 0.20800 | 31.200 |
| F | 100 | 0.22604 | 22.604 |
| | | 1.00000 | 264.504 |

TABLE 14

BONUS GAME 9 - 4 NINES TO 4 TWOS

| SEGMENT | PRIZE | PROBABILITY | RETURN |
|---|---|---|---|
| A | Progressive | 0.00160 | 8.00 |
| B | 250 | 0.07040 | 17.60 |
| C | 150 | 0.08000 | 12.00 |
| D | 100 | 0.32000 | 32.00 |
| E | 75 | 0.32000 | 24.00 |
| F | 50 | 0.20800 | 10.40 |
| | | 1.00000 | 104.00 |

TABLE 15

BONUS GAME 10 - STRAIGHT FLUSH

| SEGMENT | PRIZE | PROBABILITY | RETURN |
|---|---|---|---|
| A | Progressive | 0.00024 | 1.2000 |
| B | 100 | 0.17976 | 17.9760 |
| C | 70 | 0.22400 | 15.6800 |
| D | 50 | 0.24000 | 12.0000 |
| E | 35 | 0.23600 | 8.2600 |
| F | 20 | 0.12000 | 2.4000 |
| | | 1.00000 | 57.5160 |

TABLE 16

BONUS GAME 11 - 3 OF A KIND

| SEGMENT | PRIZE | PROBABILITY | RETURN |
|---|---|---|---|
| A | Progressive | 0.00004 | 0.2000 |
| B | 25 | 0.10000 | 2.5000 |
| C | 10 | 0.26000 | 2.6000 |
| D | 8 | 0.32000 | 2.5600 |

TABLE 16-continued

| BONUS GAME 11 - 3 OF A KIND | | | |
|---|---|---|---|
| SEGMENT | PRIZE | PROBABILITY | RETURN |
| E | 5 | 0.19996 | 0.9998 |
| | 4 | 0.12000 | 0.4800 |
| | | 1.00000 | 9.3398 |

Again, the total return to the player for the secondary wager in an embodiment suited for the game Four Card Poker™ can be calculated by summing the return to the player for each hand combination along with the percentage contribution of each bet that is added to the progressive prize. The return for each hand is the probability of each hand times the average return to the player for that hand, when expressed as a "for one" pay for its associated bonus game. Similarly, the probability of a player winning the progressive prize can be calculated by summing the probability of a qualifying hand by the probability of winning the progressive through the associated bonus game. These probabilities are illustrated for the discussed embodiment of Four Card Poker™ in Table 17 below:

TABLE 17

| FOUR CARD POKER ™ SECONDARY WAGER RETURNS | | |
|---|---|---|
| HAND | RETURN | PROGRESSIVE WIN |
| 4 Aces | 0.020861280 | 7.41195E−07 |
| 4 K's to Tens | 0.019614295 | 3.07323E−07 |
| 4 Nines to Twos | 0.015513898 | 2.36402E−07 |
| Straight Flush | 0.046651411 | 1.91338E−07 |
| 3 of a Kind | 0.233359232 | 9.02761E−07 |
| Flush | 0.220503586 | 0 |
| Straight | 0.156690368 | 0 |
| Two Pair | 0.142617047 | 0 |
| Pair of Aces | 0.031203251 | 0 |
| All Other Hands | 0.000000000 | 0 |
| Progressive Contribution | 0.05000000 | |
| | 0.937014368 | 2.37902E−06 |

As demonstrated before, the progressive cycle is the inverse of the total probability of winning the progressive, 420,341 hands.

By comparing Tables 3 and 10 with Tables 11 and 17 some important similarities as well as differences between the two exemplars will become apparent. First, it will be appreciated that the probabilities of the rarest hands in each exemplar game differ by nearly two orders of magnitude. The seven card straight flush with no joker in pai gow is almost 100 times less probable than the four aces in Four Card Poker™. However, by utilizing the present invention, the probability of a player winning the progressive on a given pai gow hand has been shifted to be greater than the probability of the of the rarest hand. In contrast, by utilizing the present invention, the probability of a player winning the progressive on a given hand of Four Card Poker™ has been shifted to be less than the probability of the rarest hand.

But more importantly, the probability of a player winning the progressive prize in either game is now substantially equal. In fact, the progressive cycle for the two games is identical to the nearest whole number. By equalizing the progressive cycle, the two disparate games can now contribute to, and play for the same progressive prize fairly. Gambling regulators often require this level of fairness for two games to contribute and vie for the same progressive prize. Therefore, for the purposes of this invention, substantially equal probabilities of winning the progressive prize or the progressive cycle should be understood to mean meeting the required level of fairness imposed by various gaming regulators in the United States.

Similarly, a progressive prize that is fairly awarded should be understood to mean that when players of two different types of games are both contributing to a single progressive prize, each player will have a substantially equal chance of winning the prize if their contributions to the prize are equal. Although it is preferable to have each player's contribution be equal when calculated on a "per wager" basis, it should be understood that this does not need to be the case as long as the overall contribution of each player is proportional to the player's chances of winning the prize. Thus, if a player of game A contributes $1 to a progressive prize for each play of game A and game A has, based on the chances of winning the prize at game A, a progressive cycle of 100,000 games, the progressive prize could be fairly competed for by a player of game B, if a player of game B contributes $2 to the prize for each play of game B if game B has a progressive cycle of 50,000 games. Both the player of games A and B would contribute, on average $100,000 to the progressive prize before it is won.

Figure 5:
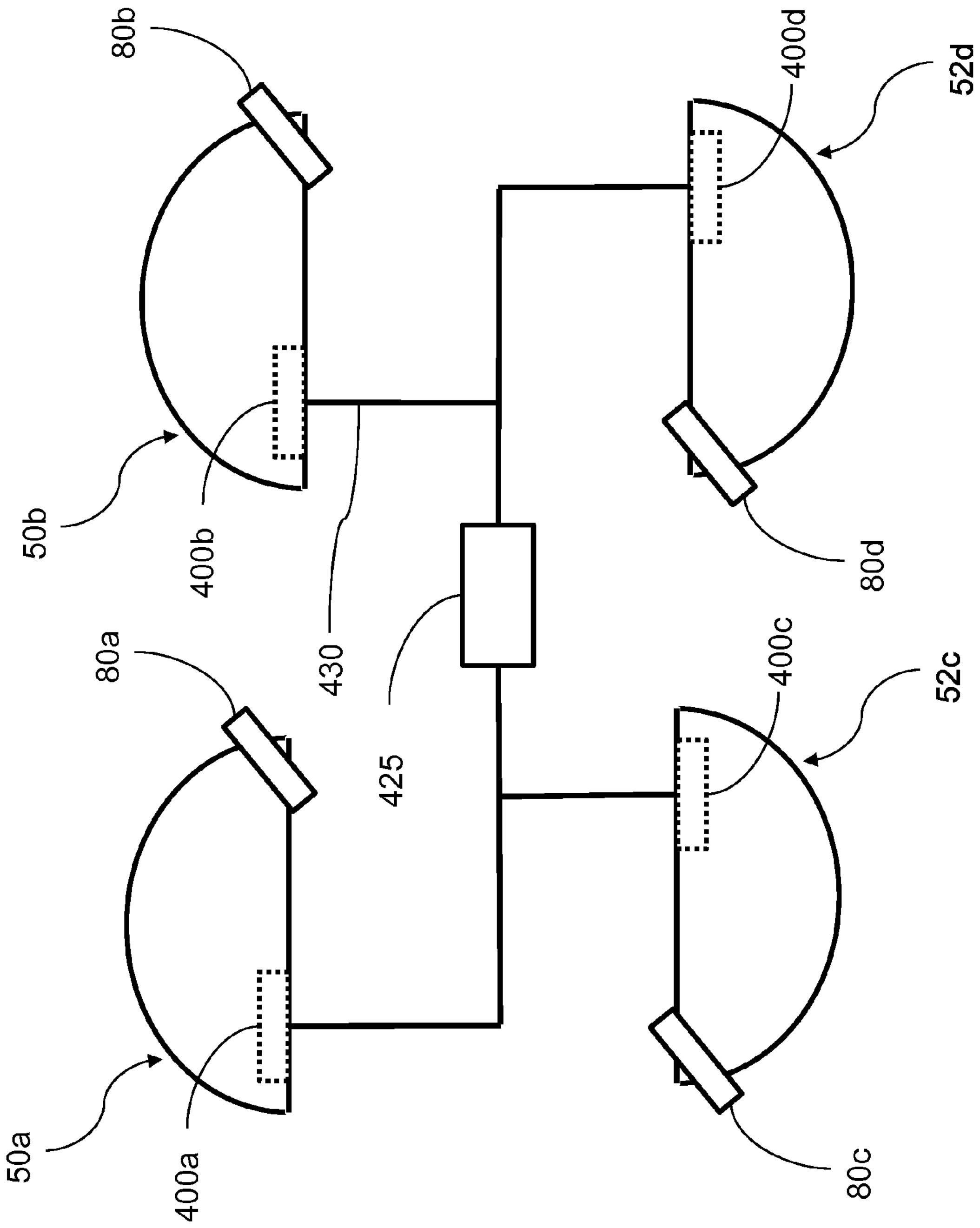
FIG. 5 is a schematic showing a plurality of tables networked to implement the present invention.

Referring now to FIG. 5 a plurality of tables networked together to share a common progressive prize will now be described. Tables 50*a* and 50*b* are pai gow tables as described above. Tables 52*c* and 52*d* are Four Card Poker tables as described above. Each table has a local computer 400*a-d* that now performs the primary function of conducting the bonus games at its associated table 50*a-b* and 52*c-d*. Additionally, local computers 400*a-d* may perform some of the duties of administering the progressive prize. Preferably, these duties comprise collecting information about the wagers place at each computer's table and relaying that information over a network pathway 430 to a centralized progressive controller 425. The centralized controller 425 may be similar in construction to local computer 400. Centralized controller 425 collects progressive contribution data from the plurality of tables and maintains the amount of the progressive prize. The amount may then be relayed back to the local computers 400*a-d* so that local computers 400*a-d* can display the amount, preferably on video displays 80*a-d*. Alternatively, centralized controller 425 may directly communicate with a plurality of local displays.

The centralized controller 425 may physically reside on the same casino floor as tables 50*a-b* and 52*c-d* or it may be located at a remote site. In such a configuration disparate table games on different casino floors can be linked to the same progressive prize. Network pathway 430 may comprise an Internet connection, a wired or wireless local area network (LAN) or a wide area network (WAN). Further, it may include additional servers, switches and other networking hardware for relaying the required data.

Other combinations, orders of operation, additions and modifications to the foregoing may also be made without departing from the scope of the present invention. Thus, the foregoing should be considered illustrative rather than limiting the invention, which is defined only by the following claims.

What is claimed is:

1. An apparatus for awarding a progressive prize at a table game, the apparatus comprising:

a table with a table layout designed for a play of a card game, the table having 1) a plurality of player positions wherein each player position includes i) a first location for placing one or more first gaming chips used as a primary wager on the play of the card game wherein the primary wager is required to play the card game at the player position and ii) a second location for placing one or more second gaming chips used as a secondary wager at the player position wherein the secondary wager is required to be eligible for a progressive prize resulting from the play of the card game at the player position and wherein the primary wager and the secondary wager are placed prior to the beginning of the play of the card game at the player position, 2) a dealer position, 3) a wager detection means to detect whether the one or more second gaming chips are at the second location at each of the plurality of player positions and 4) a display device visible to the players at the plurality of player positions;

a computer having a memory and at least one executable program, the computer operatively connected to the wager detection means and the display device, the computer programmed to increment an amount of the progressive prize in response to a detection of the one or more second gaming chips at each of plurality of player positions received from the wager detection means, the computer programmed to generate a graphical presentation of a plurality of bonus games including the graphical presentation of a first bonus game generated in response to an occurrence of a first card hand associated with a first instance of the play of the card game at a first player position having a first secondary wager and a second bonus game generated in response to an occurrence of a second card hand associated with the first instance of the play of the card game at the first player position having the first secondary wager;

wherein an equal amount is incremented to the progressive prize whether the first bonus game or the second bonus game is generated in the first instance;

the computer programmed, when the first card hand occurs in the first instance of the play of the card game having the first secondary wager, to output the graphical presentation of a play of the first bonus game on the display device and, when the second card hand occurs in the first instance of the play of the card game having the first secondary wager, to output the graphical presentation of the play of the second bonus game on the display device; and the computer programmed to award the progressive prize in response to the play of the first bonus game or the play of the second bonus game, wherein a first probability of the first card hand occurring during the play of the first instance of the card game is lower than a second probability of the second card hand occurring during the play of the first instance of the card game and, wherein a first pay table, stored on the computer that is used to generate the first bonus game, provides a third probability, which differs from the first probability, to award the progressive prize as an outcome to the first bonus game resulting from the play of the first instance of the card game and, wherein a second pay table, stored on the computer that is used to generate the second bonus game, provides a fourth probability, which differs from the second probability, to award the progressive prize as the outcome to the second bonus game resulting from the play of the first instance of the card game and, wherein the third probability is greater than the fourth probability and, wherein an overall probability of awarding the progressive prize during the play of the first instance of the card game is determined from at least the first probability, the second probability, the third probability and the fourth probability;

wherein the first pay table includes a fifth probability to award a first prize separate from the progressive prize as the outcome to the first bonus game resulting from the play of the first instance of the card game;

wherein the second pay table includes a sixth probability to award a second prize separate from the progressive prize as the outcome to the second bonus game resulting from the play of the first instance of the card game;

an input means at the dealer position on the table operatively connected to the computer for inputting to the computer the occurrence of at least the first card hand in the first instance of the play of the card game or the occurrence of the second card hand in the first instance of the play of the card game;

the computer programmed to generate a random number;

the computer programmed to, in response to receiving from the input means a first indication of the occurrence of the first card hand in the first instance of the play of the card game, generate the first bonus game including determining an award to the first bonus game using the random number and the first pay table and output the play of the first bonus game having the determined award to the display device and, in response to receiving from the input means a second indication of the occurrence of the second card hand in the first instance of the play of the card game, generate the second bonus game including determining the award to the second bonus game using the random number and the second pay table and output the play of the second bonus game having the determined award to the display device.

2. The apparatus of claim 1, wherein the card game is played with at least one predefined deck of playing cards.

3. The apparatus of claim 1, wherein the card game is one of either black jack, pai gow, Three Card Poker, Four Card Poker, Crazy For Poker, 3 Hand Hold 'Em, Ultimate Texas Hold 'Em or a game based at least in part on traditional rules of poker.

4. The apparatus of claim 1, wherein game rules of the card game comprise a plurality of predefined card hands made from at least one predefined deck of playing cards and a predefined hierarchy of card hands and wherein it is an object of the card game for a player to have a card hand that is higher in the hierarchy than the card hand made by a dealer.

5. The apparatus of claim 4, wherein the first card hand or the second card hand is an occurrence of the player's card hand, the dealer's card hand or some combination thereof.

6. The apparatus of claim 4, wherein the first card hand or the second card hand is a predetermined combination of the playing cards used by one or more players, the dealer, a group of community cards or some combination thereof.

7. The apparatus of claim 4, wherein the wager required to be eligible to win the progressive prize is separate from a primary wager, and wherein the primary wager is resolved in favor of the player if the player's card hand beats the dealer's card hand according to the game rules for the card game.

8. The apparatus of claim 7, wherein a multiplied return is awarded from the wager required to be eligible to win the progressive prize and/or the primary wager upon the occurrence of one of a plurality of predetermined combinations of the playing cards used by one or more of the players, the dealer, a group of community cards or some combination thereof.

9. The apparatus of claim 8, wherein there are a plurality of possible multipliers associated with the multiplied return, and wherein some of the multipliers are fixed for some of the predetermined combinations of the playing cards, and wherein some of the multipliers are variably selected by one of the plurality of bonus games.

10. The apparatus of claim 1, wherein the input means comprises a touch screen display accessible by a dealer and wherein the computer is further programmed to output a list of selectable card hands including at least the first card hand and the second card hand to the touch screen display.

11. A system for awarding a progressive prize at a table game, the system comprising:

a first table with a first table layout designed for a play of a first card game, the first table having, 1) a plurality of player positions wherein each player position includes i) a first location for placing one or more first gaming chips used as a primary wager on the play of the first card game wherein the primary wager is required to play the first card game at the player position and ii) a second location for placing one or more second gaming chips used as a secondary wager at the player position wherein the secondary wager is required to be eligible for a progressive prize resulting from the play of the first card game at the player position and wherein the primary wager and the secondary wager are placed prior to the beginning of the play of the first card game at the player position, 2) a dealer position, 3) a first wager detection means to detect whether the one or more second gaming chips are at the second location at each of the plurality of player positions and 4) a first display device visible to the players at the plurality of player positions, 5) a first input means at the dealer position on the first table for inputting an occurrence of at least a first card hand in an instance of the play of the first card game or an occurrence of a second card hand in the instance of the play of the first card game;

a first computer having a memory and at least one executable program, the first computer operatively connected to the first wager detection means, the first input means and the first display device, the first computer programmed to i) determine an amount to increment the progressive prize in response to a detection of the one or more second gaming chips at each of plurality of player positions received from the first wager detection means, ii) generate a plurality of first bonus games including a generation of a graphical presentation for each of the plurality of first bonus games wherein the plurality of first bonus games include a first bonus game generated in response to an occurrence of the first card hand associated with a first instance of the play of the first card game at a first player position having a first secondary wager or a second bonus game, from among the first plurality of bonus games, generated in response to an occurrence of a second card hand associated with the first instance of the play of the first card game at the first player position having the first secondary wager wherein an equal amount is incremented to the progressive prize whether the first bonus game or the second bonus game is generated in the first instance;

iii) when the first card hand occurs in the first instance of the play of the first card game having the first secondary wager, output a play of the first bonus game on the first display device iv) when the second card hand occurs in the first instance of the play of the first card game having the first secondary wager, output the play of the second bonus game on the first display device; and v) award the progressive prize in response to the play of the first bonus game or the play of the second bonus game, wherein a first probability of the first card hand occurring during the play of the first instance of the first card game is lower than a second probability of the second card hand occurring during the play of the first instance of the first card game, wherein a first pay table, stored on the first computer that is used to generate the first bonus game, provides a third probability, which differs from the first probability, to award the progressive prize as an outcome to the first bonus game resulting from the play of the first instance of the first card game, wherein a second pay table, stored on the first computer that is used to generate the second bonus game, provides a fourth probability, which differs from the second probability, to award the progressive prize as the outcome to the second bonus game resulting from the play of the first instance of the first card game, wherein the third probability is greater than the fourth probability, wherein an overall probability of awarding the progressive prize during the play of the first instance of the first card game is determined from at least the first probability, the second probability, the third probability and the fourth probability, wherein the first pay table includes a fifth probability to award a first prize separate from the progressive prize as the outcome to the first bonus game resulting from the play of the first instance of the first card game; and wherein the second pay table includes a sixth probability to award a second prize separate from the progressive prize as the outcome to the second bonus game resulting from the play of the first instance of the first card game;

v) generate a random number;

vi) in response to receiving from the first input means a first indication of the occurrence of the first card hand in the first instance of the play of the first card game, generate the first bonus game including determining an award to the first bonus game using the random number and the first pay table and output the play of the first bonus game having the determined award to the first display device and, vii) in response to receiving from the input means a second indication of the occurrence of the second card hand in the first instance of the play of the first card game, generate the second bonus game including determining the award to the second bonus game using the random number and the second pay table and output the play of the second bonus game having the determined award to the first display device; and a second table with a second table layout designed for a play of a second card game, the second table having, 1) a plurality of player positions wherein each player position includes i) a first location for placing one or more first gaming chips used as a primary wager on the play of the second card game wherein the primary wager is required to play the second card game at the player position and ii) a second location for placing one or more second gaming chips used as a secondary wager at the player position wherein the secondary wager is required to be eligible for a progressive prize resulting from the play of the second card game at the player position and wherein the primary wager and the secondary wager are placed prior to the beginning of the play of the second card game at the player position, 2) a dealer position, 3) a second wager detection means to detect whether the one or more second gaming chips are at the second location at each of the plurality of player positions and 4) a second display device visible to the players at the plurality of player positions, 5) a second input means at the dealer position on the second table for inputting an occurrence of at least a first card hand in an instance of the play of the second card game or an occurrence of a second card hand in the instance of the play of the second card game;

a second computer having a memory and at least one executable program, the second computer operatively connected to the second wager detection means, the second input means and the second display device, the second computer programmed to i) determine the amount to increment the progressive prize in response to a detection of the one or more second gaming chips at each of plurality of player positions received from the second wager detection means, ii) generate a plurality of second bonus games including a generation of a graphical presentation for each of the plurality of second bonus games, wherein the plurality of second bonus games include a first bonus game generated in response to an occurrence of the first card hand associated with a first instance of the play of the second card game at a first player position having a first secondary wager or a second bonus game, from among the plurality of second bonus games, generated in response to an occurrence of a second card hand associated with the first instance of the play of the second card game at the first player position having the first secondary wager wherein an equal amount is incremented to the progressive prize whether the first bonus game or the second bonus game is generated in the first instance;

iii) when the first card hand occurs in the first instance of the play of the second card game having the first secondary wager, output a play of the first bonus game on the second display device iv) when the second card hand occurs in the first instance of the play of the second card game having the first secondary wager, output the play of the second bonus game on the second display device; and v) award the progressive prize in response to the play of the first bonus game or the play of the second bonus game, wherein a first probability of the first card hand occurring during the play of the first instance of the second card game is lower than a second probability of the second card hand occurring during the play of the first instance of the second card game, wherein a first pay table, stored on the second computer that is used to generate the first bonus game, provides a third probability, which differs from the first probability, to award the progressive prize as an outcome to the first bonus game resulting from the play of the first instance of the second card game, wherein a second pay table, stored on the second computer that is used to generate the second bonus game, provides a fourth probability, which differs from the second probability, to award the progressive prize as the outcome to the second bonus game resulting from the play of the first instance of the second card game, wherein the third probability is greater than the fourth probability, wherein an overall probability of awarding the progressive prize during the play of the first instance of the second card game is determined from at least the first probability, the second probability, the third probability and the fourth probability, wherein the first pay table includes a fifth probability to award a first prize separate from the progressive prize as the outcome to the first bonus game resulting from the play of the first instance of the second card game; and wherein the second pay table includes a sixth probability to award a second prize separate from the progressive prize as the outcome to the second bonus game resulting from the play of the first instance of the second card game;

v) generate a random number;

vi) in response to receiving from the second input means a first indication of the occurrence of the first card hand in the first instance of the play of the second card game, generate the first bonus game including determining an award to the first bonus game using the random number and the first pay table and output the play of the first bonus game having the determined award to the second display device and, vii) in response to receiving from the second input means a second indication of the occurrence of the second card hand in the first instance of the play of the second card game, generate the second bonus game including determining the award to the second bonus game using the random number and the second pay table and output the play of the second bonus game having the determined award to the second display device.

12. The system of claim 11, wherein the first card game is identical to the second card game.

13. The system of claim 11, wherein the first computer and the second computer are a single device.

14. The system of claim 11, wherein the first card game or the second card game are each one of either black jack, pai gow, Three Card Poker, Four Card Poker, Crazy For Poker, 3 Hand Hold 'Em, Ultimate Texas Hold 'Em or a game based at least in part on traditional rules of poker.

15. The system of claim 11 further comprising a third computer configured to receive the amount to increment the progressive prize from the first table or the second table and increment the progressive prize.

* * * * *